United States Patent [19]
Bianchi

[11] 3,819,286
[45] June 25, 1974

[54] HYDRAULIC TIGHTENING-UP DEVICE FOR VERY HIGH STRESSES

[75] Inventor: Turreno Bianchi, Terni, Italy

[73] Assignee: S.A.I.P. (S.p.A.), Terni, Italy

[22] Filed: Nov. 1, 1971

[21] Appl. No.: 194,297

[52] U.S. Cl. .............................. 403/31, 403/408
[51] Int. Cl. ............................................. F16b 5/04
[58] Field of Search............ 287/189.36 F; 85/32 T, 85/32 R, 9 R, 1 T, 50; 254/29 A; 29/446, 29/454; 403/15, 31, 40, 408

[56] References Cited
UNITED STATES PATENTS
| | | | |
|---|---|---|---|
| 2,571,265 | 10/1951 | Leufven .............................. | 85/32 R |
| 2,756,777 | 7/1956 | Bourns et al ........................ | 29/454 X |
| 3,130,628 | 4/1964 | Blinn ..................................... | 85/1 T |

FOREIGN PATENTS OR APPLICATIONS
| | | | |
|---|---|---|---|
| 1,136,280 | 12/1968 | Great Britain ........................ | 85/9 R |

*Primary Examiner*—Andrew V. Kundrat
*Attorney, Agent, or Firm*—Allen D. Brufsky

[57] ABSTRACT

A hydraulic tensioning device for securing together two plate elements initially in contact with each other, but which tend to separate under the effect of working stresses, comprising a rod, passing through both plates, having an enlarged head which engages the outer surface of the second plate. At the other end of said rod, a cap is mounted which abuts against the outer surface of the first plate. Interposed between the cap and the first plate is a device of variable volume, which includes a substantially closed annular chamber defined by flexible metallic walls which can be strained at least in the direction of the axis of said rod. Means connected to a fluid source are provided for supplying a pressurized fluid into said chamber in order to maintain the tension on the rod and thus the seal connection between the two plates despite the tendency of the two plates to separate during the application of the working stresses.

7 Claims, 3 Drawing Figures

PATENTED JUN 25 1974    3,819,286

HYDRAULIC TIGHTENING-UP DEVICE FOR VERY HIGH STRESSES

BACKGROUND AND SUMMARY OF THE INVENTION

The present invention relates to a hydraulic tensioning device designed to be used to keep two plate members secured to one another despite the tendency of the plate members to move away from one another under the effect of a stress acting between them.

The device of the invention comprises a rod which passes through holes bored through the plates to be connected. The rod has an integral enlarged head at one end which abuts against the outer surface of one of the two contacting plates. At the other end of the rod there is provided a second enlarged head or cap. Between the outer surface of the second contacting plate and the second rod head or cap is interposed a means having a variable thickness. This latter means consists of an annular fluid tight chamber defined by walls formed by flexible steel diaphragms. A pressurized fluid is supplied to this chamber, forcing said flexible walls to recede from each other, and generating force which is transmitted through said tensioning device to the outer surfaces of the two contacting plates. The force generated by the pressurized fluid is high enough to overcome the force which tends to move the contacting plates away from one other, thus assuring hermetic sealing of the joint zones of the contacting plates.

The device of this invention can be used for various purposes; i.e., it can be used anywhere two plate members have to be kept joined together which are subjected to stresses of very high intensity, which stresses would tend to move the plates away from each other. In particular this device can advantageously be used in machines for hydrodynamic drawing of sheet metal articles. In such machines it is a requirement that the upper row remain in contact with the bed during the drawing step despite the application of a force of 20,000,000 Kg during the drawing cycle.

The prior art uses for such a purpose well known conventional latching devices, such as jacks or hydraulic tensioning devices, arranged along the joint line to take up the thrust which is generated during the drawing process. These known devices are essentially a cylindrical body, with an integral chamber having an open bottom, and a solid head, joined to the top of one of the two plates. A piston reciprocates in the chamber. The piston rod passes through both plates to be connected, ending with an enlarged head designed to be locked against the outer surface of the second plate. A pressurized fluid is confined in the integral chamber in the space defined within the cylinder by the piston and the solid head of the cylinder. This latching device is positioned to compensate for the force generated during the increasing of the drawing load, which tends to separate the two plates in contact, thus assuring that contact between the two plates is maintained. This known tensioning device is expensive to produce and the maximum working pressures of the entrapped fluid in the cylindrical chamber is from 700 to 800 atm.

The present invention aims to provide a hydraulic tensioning device less expensive to produce and which has a simpler structure than those presently available, said device being adapted to be advantageously used where very high working stresses can be expected that result in displacements of only middling magnitude.

The device of the invention comprises a chamber of variable volume which is substantially sealed so that fluid leakage is prevented, and which operates under very high stresses.

The accompanying drawing shows merely by way of example, without limiting the invention, an embodiment of this invention, in which:

BRIEF DESCRIPTION OF THE INVENTION

DETAILED DESCRIPTION OF THE INVENTION

Figure 1:
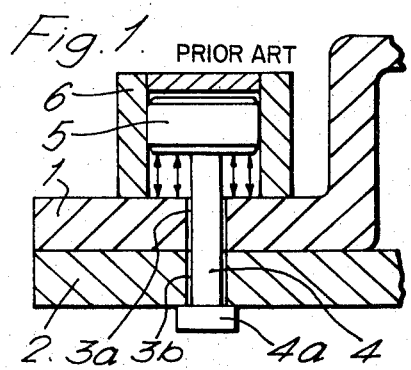
FIG. 1 is a diagrammatic axial section of a conventional prior art latching device given merely for comparative purpose.

Now referring to the comparative diagrammatic sectional view of FIG. 1, the prior art latching means, designed to secure the plates 1 and 2, consists of a rod 4 passing through two aligned holes 3a, 3b bored through the plates 1, 2 respectively. Rod 4 has an enlarged lower head 4a designed to abut against the outer surface of the lower plate 2. The other end of the rod has a second enlarged portion forming a piston 5 which reciprocates within the cylinder 6. Cylinder 6 has an upper solid head and an open bottom portion. The sidewalls adjacent the bottom are secured to a portion of the outer surface of the plate 1. A pressurized fluid is fed into the space defined by said plate 1 and the piston body 5, the pressure of said fluid forcing the two plates 1 and 2 one against the other.

Figure 2:
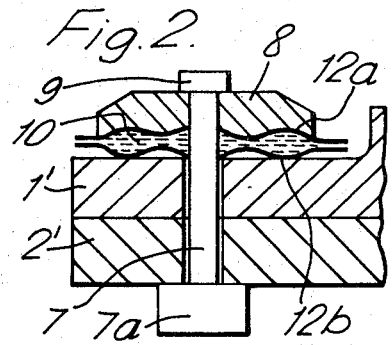
FIG. 2 is a similar axial section of the device according to the present invention.

The diagrammatic structure of the device of this invention is shown in FIG. 2, where 1' and 2' indicate respectively the two plates to be connected. The device of this invention comprises a tensioning rod 7 of any suitable material, which at one of its ends has an enlarged head 7a designed to press against the outer surface of the plate 2', while at the other end a cap 8 is fixed by a locking means 9 in any disassemblable manner, said cap resting on a wall of an annular chamber 10 of a variable volume which is defined by two flexible diaphragms 12a, 12a' made of elastic steel and preferably having corrugated walls in order to increase the elasticity of the steel. The chamber 10 is in communication with a source of pressurized fluid by a means not shown in FIG. 2. Said pressurized fluid entering said chamber 10 causes its volume to increase thus forcing the facing walls 12a, 12b to recede away one from the other so that a direct pressure is generated on the plate 1', while a thrust is produced on the cap 8 towards the outside, said thrust through the rod 7 generating a compressive force of the head 7a against the outer surface of the plate 2', said two effects maintaining the seal connection between the two facing surfaces of the plates 1' and 2' despite the stresses caused by the hydrodynamic working forces.

Figure 3:
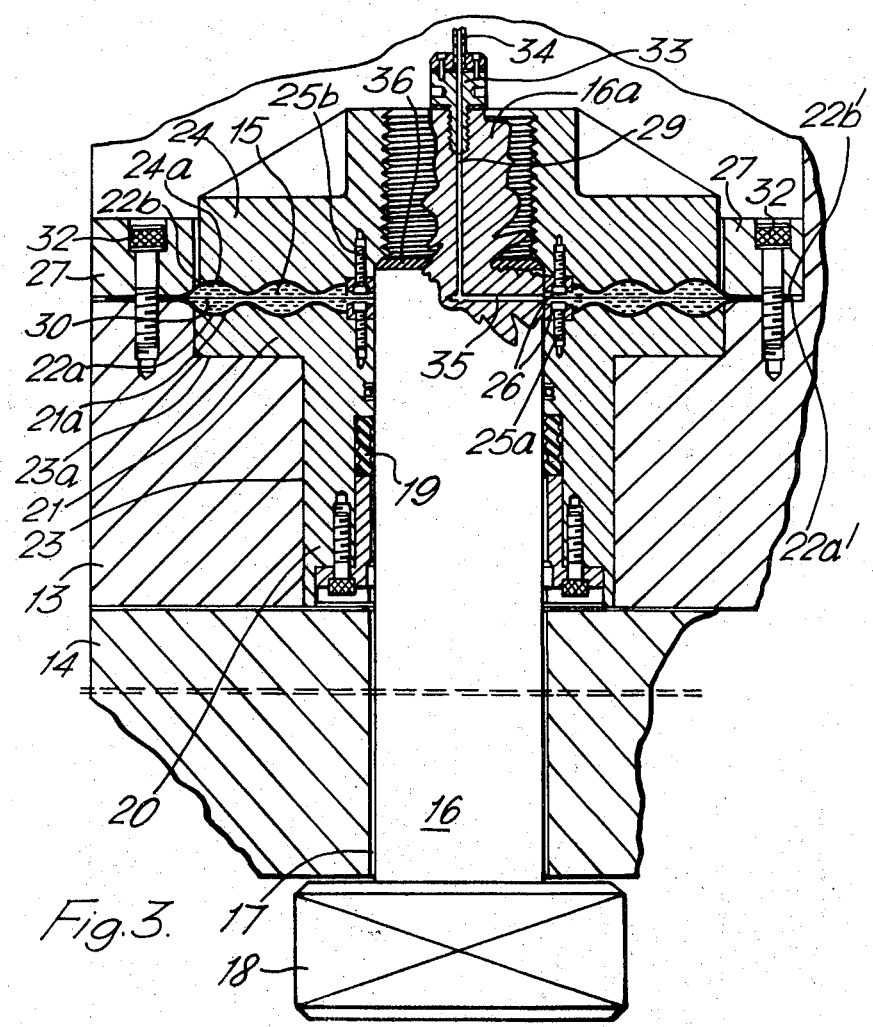
FIG. 3 is an axial sectional view of the tensioning device of the present invention in detail, said device being so designed as to be applied to a machine for a hydrodynamic drawing.

In FIG. 3 is shown a practical embodiment of the device according to this invention. This construction finds application in a machine for the hydrodynamic drawing of metallic sheets and is used to maintain the seal formed initially between the upper ram of the press, which is integral with a plate edge 13, and the sheet holding plate 14 of the bed.

A plurality of similar tensioning devices are arranged, uniformly spaced apart from each other, along the contact area, one of them being shown in FIG. 3. Each of said tensioning devices comprises a rod 16 which at one of its ends has an enlarged head 18 resting against the outer surface of the bed plate 14, through which a hole 17 is bored. At the opposite end of said rod or tie rod 16 a sleeve 20 is mounted with the interposition of suitable packing means, generally indicated 19, said sleeve having at its end a wide flange 21, the outer surface 21a of which is designed to support one surface of the flexible diaphragm which in combination defines a chamber 15 of variable volume. Said outer surface 21a will be so shaped as to be able to match with the corrugated wall of the diaphragm 22a supported by it. The flanged sleeve 20, 21 is housed into a seat 23, 23a arranged into the plate 13. At 24 is marked a reaction cap mounted in any disassemblable manner by any suitable means and with the interposition of a packing ring 36 on the restricted end 16a of the tie rod 16, which can lightly slide with respect to the flanged sleeve 20, 21. Also the surface 24a of the cap 24 which is intended to be positioned before the surface 21a is so shaped as to match with the wall of the diaphragm 22b. The diaphragms 22a, 22b are fixed to the body of the flange 21 and to that of the cap 24 respectively at the zone near the rod 16 by means of a plurality of screws 25a and 25b respectively with the interposition of packing rings 26, said diaphragms extending beyond the peripheral edges of the flange 21 and of the cap 24 respectively with peripheral edges 22a' and 22b'.

In order to ensure a seal jointing between the two peripheral edges 22a' and 22b' of the diaphragm 22a, 22b a packing lock washer 30 is mounted between said edges. Said edges are locked together and both secured to the plate 13 by a pressing ring 27 mounted on the edge 22b' and securely fixed to the body 13 by a plurality of screws 32 or the like spaced apart to each other along a circle concentric with the axis of the tensioning device. Thus, the two flexible diaphragms 22a, 22b define in combination an annular chamber 15 having a variable volume on account of the fact that, as a presurized fluid is supplied therein, the flexible diaphragms recede from one other and the flexible diaphragm 22a presses against the wall 21a, while the diaphragm 22b presses against the surface 24a of the cap 24 which together with the rod 16 can perform only a small displacement allowed by the possible tensioning of the tie rod 16. The end 16a of this tie rod 16 on which is mounted the cap 24 is also utilized for housing means for conveying the fluid into the chamber 15. For such a purpose into the body of the rod 16, 16a is arranged a conduit 29 preferably positioned in axial direction and which by means of at least one radial conduit 35 communicates with the chamber 15, while through a seal pipe fitting, 33, it is connected to a pipe 34 which conveys the pressurized fluid, in particular oil, said pipe 34 being connected to a reservoir of presurized fluid which is associated with means adapted to induce into the fluid the desired pressure and which is also associated with control and adjusting valves, said devices being not shown in the drawing, since they are well known in the art and are commonly used for similar intended purposes.

As a perfect hermetic connection between the plate elements 13 and 14 must be attained and maintained, the pressurized fluid is fed into the chamber 15 of each hydraulic tensioning device. Said pressurized fluid forces the flexible diaphragms to recede from each other causing a small displacement of the cap 24 towards the outside which generates a tension on the rod 16 which by its head 18 presses against the plate 14. The force generated by increase of the fluid pressure is transmitted through the flange 21 and acts on the plate 13 so that a hermetic and perfect seal connection is obtained between the two plates 13, 14. The stresses generated under the action of the increased fluid pressure must obviously have such an intensity as to induce in the rods 16 of all the tensioning devices a pre-tensioning at least sufficient to counteract the stresses generated by the hydrodynamic forming process which act in the opposite direction and which will be transmitted to the plates 13 and 14 during the working.

It is obvious, of course, that the working length of the rod is chosen so as to maintain the two plates in sealing connection prior to the application of the working stress. The length of the rod must also be long enough to permit positioning of the variable volume chamber between the two heads. The seal 19 must be tight enough to prevent leakage of the fluid even under the highest pressure application generated during the working process, but must permit some axial movement of the rod 16 as it reacts to the stresses created by the increase in fluid pressure in chamber 15.

I claim:

1. A hydraulic tightening-up device for connecting together two plate elements or the like initially in contact one to the other, but which undergoes working stresses which tend to move one away from the other, said device comprising a rod passing through said first and second plates having at one of its ends an enlarged head which engages the outer surface of the second plate, at the other end of said rod is mounted a cap which abuts against the outer surface of the first plate through an interposed device having a variable volume, said variable volume device including a substantially sealed annular chamber defined by said rod and two flexible annular walls substantially perpendicular to the rod axis, said walls being sealed closed at their radial outer peripheral edges one to another and can be strained at least in the direction of the axis of said rod by an inner pressurized fluid, means being provided for supplying said pressurized fluid into said chamber which is connected to a fluid source so that contact between the two plates is due to the direct effect of the application of the fluid pressure, which one of said two flexible walls of said chamber transmits directly to the outer surface of the first plate while the other flexible wall of said chamber transmits the effect of the fluid pressure to said cap and which through this latter pressure causes the tensioning of said rod which in turn causes its head to press against the outer surface of the second plate.

2. A hydraulic tightening-up device according to claim 1, wherein the working length of the rod is such as to maintain the two plates in contact prior to the application of the working stresses, with the variable volume device in place, the parts of the device being proportioned to provide a pre-tensioning at least equal to the maximum of the working stresses acting to move the plates away from each other and thus break the contact.

3. A hydraulic tightening-up device according to claim 1, wherein the annular chamber is defined by two annular flexible diaphragms having corrugated walls, one of said flexible diaphragms abutting against the inner surface of the cap and the other against the outer surface of the first plate, the surface portions of the cap and of the first plate, which abut said two diaphragms respectively, being shaped in such a manner as to match with the outer surfaces of said flexible corrugated walls, locking means being provided and arranged along the radial outer peripheral edges of said two annular diaphragms in order to seal the edges of the diaphragms together.

4. A hydraulic tightening-up device for connecting together two plate elements or the like initially in contact one to the other, but which undergoes working stresses which tend to move one away from the other, said device comprising a rod passing through said first and second plates having at one of its ends an enlarged head which engages the outer surface of the second plate, at the other end of said rod is mounted a cap constituted of an upper and a lower part, of which the lower part abuts against the outer surface of the first plate, interposed between said upper and lower part of said cap is a device having a variable volume, said variable volume device including a substantially sealed annular chamber defined by said rod and two flexible annular walls substantially perpendicular to the rod axis and sealingly connected at their radial outer peripheral edges and which can be strained at least in the direction of the axis of said rod by an inner pressurized fluid, means being provided for supplying said pressurized fluid into said chamber which is connected to a fluid source so that contact between the two plates is due to the effect of the application of the fluid pressure, which one of said two flexible walls of said chamber through the lower part of the cap transmits the effect of the fluid pressure directly to the outer surface of the first plate while the other flexible wall of said chamber transmits the effect of the fluid pressure through the upper part of said cap and through this latter pressure causes the tensioning of said rod which in turn causes its head to press against the outer surface of the second plate.

5. A hydraulic tightening-up device according to claim 4 wherein the annular chamber is defined by two annular flexible diaphragms having corrugated walls, one of said flexible diaphragms abutting against the upper part of the cap and the other against the lower part of the cap which in turn abuts against the outer surface of the first plate, the surface portions of the cap which abut said two diaphragms respectively being shaped in such a manner as to match with the other surfaces of said flexible corrugated walls, locking means being provided and arranged along the outer and inner peripheral edges of said two annular diaphragms in order to seal the edges of the diaphragms together.

6. A hydraulic tightening-up device according to claim 5, wherein the radial outer peripheral edges of the annular flexible diaphragms are connected one to the other with the interposition of a lock washer and the outer peripheral edges are locked to the body of the first plate by a plurality of screws with the interposition of an annular member provided to evenly distribute the pressure along said edges.

7. A hydraulic tightening-up device according to claim 4, wherein the body of the rod has a substantially axial hole, said hole communicating with at least one radial conduit leading to the annular chamber formed between the two diaphragms near their centre orifice, said axial conduit being connected to a pipe feeding the pressurized fluid through a pipe union, said feeding pipe being associated with stop and control means.

* * * * *